Jan. 27, 1970   H. SCHRIFTMAN   3,491,883
GEL TRAY ASSEMBLY
Filed Feb. 26, 1969   2 Sheets-Sheet 2
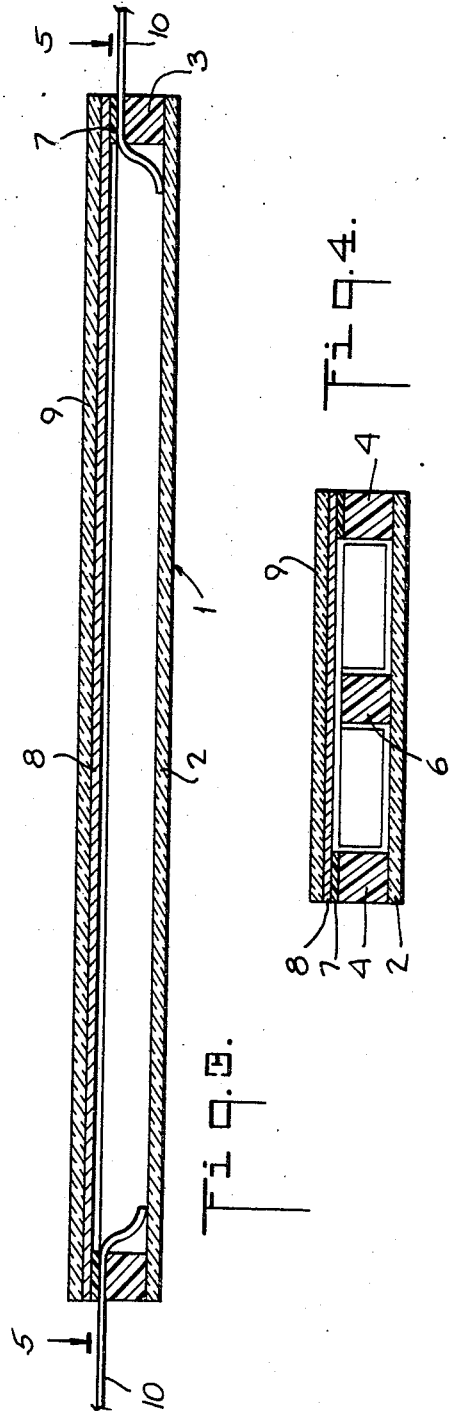
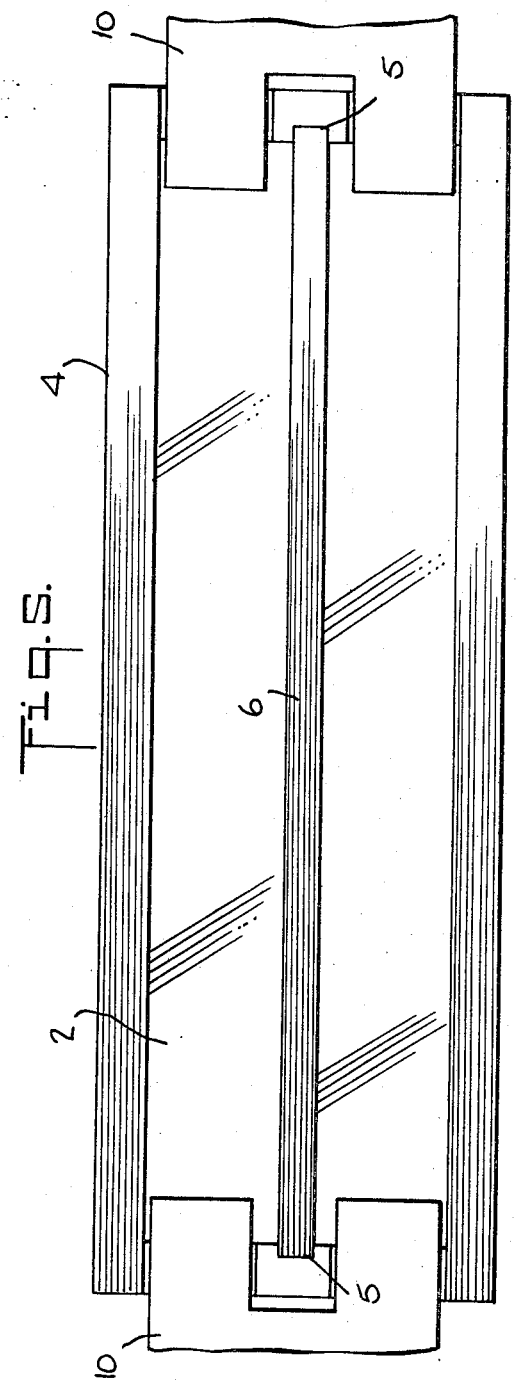
INVENTOR.
HERBERT SCHRIFTMAN
BY Neil D. Edwards
ATTORNEY

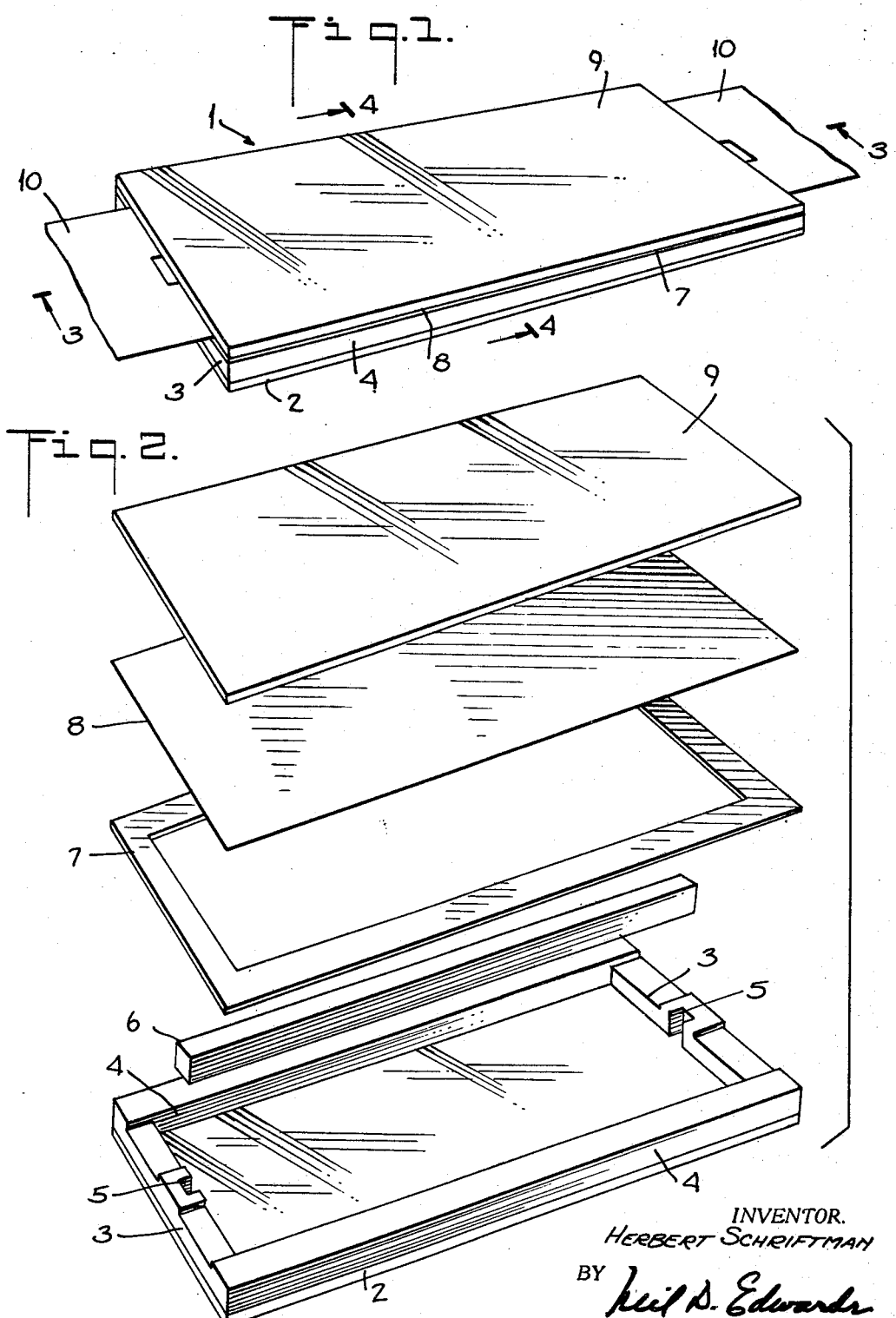

United States Patent Office 3,491,883
Patented Jan. 27, 1970

3,491,883
GEL TRAY ASSEMBLY
Herbert Schriftman, Maple Glen, Pa., assignor to Warner-Lambert Pharmaceutical Company, Morris Plains, N.J., a corporation of Delaware
Filed Feb. 26, 1969, Ser. No. 802,462
Int. Cl. B01d *15/08*
U.S. Cl. 210—94    7 Claims

ABSTRACT OF THE DISCLOSURE

A gel tray assembly, and its use in the chromatographic and/or electrophoretic separation of organic compounds, is described. The assembly comprises the combination of (1) a tray having a base which is transparent to light in the ultraviolet range, (2) a detachable dividing means which divides the tray into at least two compartments of equal area, (3) a transparent thin layer of chromatographic plate or sheet overlaying said tray with it coated surface facing down, and (4) a protective means disposed between said plate or sheet and the upper surface of the walls of said tray.

Brief summary of the invention

The present invention relates to a novel gel tray assembly and to its use in chromatographic and/or electrophoretic techniques for separating organic compounds. Additionally, the invention relates to the in situ detection and analysis, by ultraviolet densitometry, of the compounds thus separated.

The gel tray assembly of the invention comprises the combination of (1) a tray comprising a base which is transparent to light in the ultraviolet range, said base being enclosed by four connected walls, (2) a detachable dividing means which serves to divide the tray into at least two compartments of equal area, said dividing means being held in place by a retaining means set in one pair of opposite tray walls, (3) a transparent thin layer chromatographic plate or sheet, the coated surface of which may, and preferably does, fluoresce when exposed to light in the ultraviolet range, overlaying the walls of said tray with its coated surface facing down, and (4) a protective means for keeping separate the upper surface of said walls and the bottom surface of said plate or sheet. As used herein, the expression "transparent thin layer chromatographic plate or sheet" denotes a transparent plate or sheet which has been appropriately coated for use in thin layer chromatography.

In carrying out the separation, the gel tray is filled with agarose gel or with some other medium of the type conventionally used in electrophoretic or chromatographic separations. While the gel is in a fluid state, the tray is divided into at least two compartments of equal area by inserting the dividing means therein. The mixture to be separated and detected is thereafter added to the gel in one of the compartments. The reference material or materials is added to the gel in the other compartment. In the chromatographic procedure, solvent is caused to flow by gravity into and through the gel in each compartment. The solvent is allowed to discharge from the tray by means of suitable means. In the electrophoretic separation, the gel is connected through wetted wicks to the electrodes of the electrophoresis apparatus and the separation of the mixture into its components is brought about by the flow of electric current. In the chromatographic procedure, by positioning a short wave ultraviolet lamp below the transparent base and viewing, from above, through the transparent thin layer chromatography plate or sheet, the separation of the compounds and the migration of the spots can be observed periodically and continuously. Continuous observation during an electrophoretic separation is not now possible because of the nature of the electrophoresis apparatus presently available. Using currently available equipment, intermittent observation of the separation can be made by disconnecting the wicks from the electrophoresis apparatus, removing the tray, intact, from the apparatus and, thereafter, positioning the short wave ultraviolet lamp below the transparent base. When, in either technique, separation is complete, the intact tray can be placed on a suitable scanning device for quantification of the components, or in the alternative, the tray can be removed, the contents eluted and analyzed by conventional techniques or procedures.

Brief description of the several views of the drawings

FIGURE 1 is a view of the assembled gel tray assembly.
FIGURE 2 is a view showing individually the several elements of the gel tray assembly.
FIGURE 3 is a longitudinal sectional view of the gel tray assembly.
FIGURE 4 is a latitudinal sectional view of the gel tray assembly.
FIGURE 5 is a top view of the gel tray assembly.

Detailed description

Column chromatographic and paper electrophoretic techniques have been used in the past for separating and analyzing proteins, biological metabolites and various other organic substances. For the most part, the prior art techniques involve extensive and time-consuming operations. In the case of chromatography, the manner in which the columns are packed is extremely important. Unformity and consistency in packing is imperative in order to obtain reproducible results from one analysis to another. In the case of electrophoresis, proper staining of the papers is critical. The paper must be stained properly, prior to densitometric evaluation, in order to obtain accurate and reproducible results.

In recent years, improvements have been made in column chromatographic and electrophoretic techniques. Such improvements include, for example, the use of hydrolyzed starch and polyacrylamide which, in the form of gels, serve as molecular sieves. Similarly, cross-linked dextrans and non-ionic, highly purified derivatives of agar have been found suitable for use as media in the separating techniques. The cross-linked dextrans are used primarily in column chromatographic separations while the agar derivatives are used principally in electrophoresis for the analysis of serum proteins, spinal fluid proteins, hemoglobins, lipo-proteins and lactic acid dehydrogenase isosymes.

However, although substantial advances in these separation techniques have taken place in the recent past, the methods generally have one major drawback, namely, they do not always produce reproducible results.

The present invention provides an assembly which can be used in the chromatographic and/or electrophoretic separations of organic compounds. The apparatus is such that the separation and migration of the compounds present can be visually observed and it permits the separated compounds to be detected and analyzed, in situ, by ultraviolet densitometry.

The gel tray assembly of this invention comprises the combination of:
(A) a rectangular shaped tray comprising a base enclosed by four connected walls, said base being transparent to light in the ultraviolet range, the first pair of opposite tray walls being continuous and uniform in height throughout their entire length, the second pair of opposite tray walls being lower in height than the first pair of opposite tray walls, each of the walls comprising said second pair of opposite tray walls including at least one means for retaining a separating means which divides the tray into compartments of equal area, said retaining means being of variable height but being no higher than the first pair of opposite tray walls and no lower than the second pair of opposite tray walls;

(B) a detachable dividing means set in said tray, the bottom surface of said dividing means being in contact, throughout its entire length, with the upper surface of the tray base, said dividing means being held in place by the retaining means included in the said second pair of opposite tray walls and said dividing means being the same height as said retaining means;

(C) a transparent thin layer chromatographic plate or sheet, i.e., a transparent plate or sheet which has been appropriately coated for use in thin layer chromatography, coated surface facing down, overlaying said tray, the coated surface of said plate or sheet may be, and is preferably, fluorescent under ultraviolet light, and (D) a separating means interposed between the upper surface of the tray walls and said transparent thin layer chromatographic plate, the lower surface of said separating means being in contact with the upper surface of said first pair of opposite tray walls, but not in contact with the second pair of opposite tray walls, the upper surface of said separating means contacting only the outer edges of the lower coated surface of said chromatographic plate or sheet, and optionally, (E) a cover means, preferably a transparent means, overlaying the upper surface of the thin layer chromatographic plate or sheet.

Referring now to the drawings, there is shown in FIGURE 1, the assembled gel tray assembly 1 comprising base 2, tray walls 3 and 4, separating means 7 and transparent thin layer chromatographic plate 8. FIGURE 2 shows base 2, tray walls 3, tray walls 4, retaining means 5, dividing means 6, separating means 7, plate 8 and cover 9. Tray walls 3 are lower in height than tray walls 4. Retaining means 5 is shown to be the same height as tray walls 4. However, retaining means 5 could be lower in height than shown but in no event would retaining means 5 be lower in height than tray walls 3. Detachable dividing means 6 is designed to be set in the tray, held in place by retaining means 5, to divide the tray into two compartments of equal area. Dividing means 6 is shown to be the same height as tray walls 4. However, it could be lower in height than shown but, in no event, would it be lower in height than tray walls 3. In an alternate embodiment of the invention, additional retaining means can be included in tray walls 3 to enable the tray to be divided into 3, 4, 5, etc. separate compartments by the imposition of a suitable dividing means. Separating means 7 overlays the top surface of the tray walls. When in position, the lower surface if separating means 7 is in contact with the upper surface of tray walls 4. Separating means 7 is not in contact with the upper surface of tray walls 3. However, where retaining means 5 is of the same height as tray walls 4, the lower surface of separating means 7 would be in contact also with the upper surface of retaining means 5. Separating means 7 is overlayed with plate 8. The coated surface of plate 8 faces in a downward direction. Only the outer edges of the lower coated surface of plate 8 are in contact with the upper surface of separating means 7. An optional covering means 9, preferably transparent in nature, can be positioned on top of, and in contact with, the upper, i.e. non-coated, surface of chromatographic plate 8.

The gel tray assembly of this invention is used as follows in the chromatographic separation and identification of organic compounds. A gel-forming medium of the type conventionally used in chromatography is added to the tray in a fluid state. The dividing means 6 is inserted in the tray, held in place by retaining means 5. The sample to be analyzed is added to the medium in one compartment, while the reference material is added to the medium in the other compartment. The tray is then overlayed with separating means 7 and plate 8 is positioned, coated surface down, on the assembly in contact with separating means 7. Paper wicks 10 are inserted into both ends of the tray through the opening which exists between the upper surface of opposite tray walls 3 and separating means 7. The inserted end of each wick is in contact with the medium. The tray is adjusted in a suitable holder so that one end of the tray is higher than the other. This facilitates the flow of solvent through the system. Although the invention is not restricted thereto, the purposes of this invention are best served by adjusting the tray to an angle of 10° to 20° to the horizontal. The exposed ends of the paper wicks at the upper edge of the tray are placed in the solvent reservoir. The paper wicks at the lower edge of the tray are allowed to hang freely into an empty container. The solvent flows from the reservoir to the upper wicks through the gel medium and it is discharged to the empty container through the lower wicks. Since the flow of the solvent through the gel is regulated by the angle of the tray, the angle may be increased to increase the rate of flow through the paper wicks. In the alternative, the solvent flow can be enhanced by placing an additional solvent reservoir above the first one, leading additional paper wicks from this second reservoir to the wicks which are immersed in the first reservoir. By positioning an ultraviolet light beneath the tray assembly, one can continuously observe the separation and migration of spots representing the compounds being separated. After the separation is complete, the intact tray can be placed on a suitable scanning device, for example, a Photovolt thin layer chromatography densitometer for quantification of the separated compounds.

The manner in which the gel tray assembly of this invention is used in the electrophoretic separation of compounds is somewhat different than the above described chromatographic procedure. In the first step, a gel-forming medium, suitable for use in electrophoretic separations, is prepared, generally in the presence of an appropriate buffer solution. While still in a fluid state, the medium is poured into the tray. Dividing means 5 is inserted into the tray, following which the fluid medium is allowed to set to a gel. The material to be analyzed is added to the gel in one of the thus formed compartments, while the reference material is added to the gel in the other compartment. The tray is then overlayed with separating means 7. Plate 8 is positioned, coated surface facing down, on the assembly, in contact with separating means 7. Paper wicks 10, moistened with buffer, are inserted into one end of the tray only, in contact with the gel. The exposed edge of the wicks, i.e., the wick ends which are outside of the tray and not not in contact with the gel, serve as the connecting link between the tray and the electrode compartments of the electrophoresis apparatus. In general, the gel tray assembly of this invention can be connected to any conventional electrophoresis apparatus. Particularly well suited for use, however, is the WCLID instrument or a unit manufactured by E–C Apparatus Company. The material to be analyzed readily separate and migrates when the current is turned on. Electrophoresis apparatus, which is presently available commercially, is constructed in such a manner that continuous observation of the separation and migration of compounds is not possible. Intermittent observation is possible by disconnecting the paper wick bridges from the electrophoresis instrument, removing the intact tray from the instrument and, thereafter, positioning a short wave ultraviolet light beneath the transparent tray and viewing from above, through the transparent plate or sheet. When the separation has been completed, the intact tray is disconnected from the paper wick bridges and it is scanned intact, on the Photovolt thin layer chromatography densitometer.

An added feature of the present invention resides in the fact that it is possible to run a chromatographic separation as well as an electrophoretic separation on the same materials in the same tray. In addition, the migrations can be carried out in two dimensions with very little modification of the system.

Unless otherwise indicated, the type of material used in producing the various components of the tray assembly of this invention is not particularly critical. Furthermore, the size or shape of the gel tray assembly, and its components, is not critical. Thus, for example, base 2 can be made of any glass or other media which permits the penetration of light in the ultraviolet range. In the preferred embodiment of the invention, base 2 is a commercially available grade of Corning Glass No. 9863, which permits penetration by light at a wave length of 254 m$\mu$. Tray walls 3 and 4, retaining means 5, dividing means 6, separating means 7 and cover 9 may be constructed of any suitable inert material. Preferably, however, these components are made of plastic. Plate 8 is preferably a thin layer chromatography plate coated with a phosphor active at 254 m$\mu$.

As will be readily apparent from the foregoing description and from the working examples which follow hereinafter, the gel tray assembly of this invention offers several distinct advantages over the apparatus presently available. In the first place, it affords a means for detecting the components of a sample, after their chromatographic or electrophoretic separation, which is more rapid and more sensitive than is possible using presently available apparatus. Furthermore, the separation does not result in the destruction of the components of the sample. Thus, at the completion of the separation, the various components are readily available for additional analytical work. This aspect has particular significance when the sample in use contains a multiplicity of components with diverse chemical activity. An additional advantage resides in the fact that the gel tray assembly is inexpensive to manufacture and it requires little or no maintenance. Furthermore, the system is of such relative simplicity that extensive training of an operator is not necessary to operate same efficiently and effectively.

For a fuller understanding of the nature and objects of this invention, reference may be had to the following examples which are given merely as further illustrations of the invention and are not to be construed in a limiting sense.

Example 1

This example demonstrates the manner in which the gel tray assembly of the invention is used in a chromatographic procedure.

In this example, 5.0 grams of Sephadex Gel G–25, a commercially available superfine grade of cross-linked dextran was added to 25 ml. of 0.1 N sodium hydroxide. The product was allowed to swell over a period of about 5 hours. At the end of that time, 20 ml. of the fluid product was poured into the gel tray described herein (dimensions 2″ x 6½″ x ¼″) to completely cover the transparent glass base. The gel-forming product was allowed to level off in the tray, following which the plastic dividing means was inserted in the tray to form therein two compartments of equal area. Into one compartment there was added 5 $\mu$l. of a 2 mg./ml. solution of 3,5-diodo-L-thyronine in a mixture of methanol and ammonia (19:1) and 5 $\mu$l. of a 10 mg./ml. solution of sodium levothyroxine. Into the other compartment there was added 5 $\mu$l. of a 10 mg./ml. solution of sodium levothyroxine. The samples were applied to the compartments as round spots using micropipettes, sold commercially under the trade name Microcaps.

Thereafter, Whatman No. 3 MM paper wicks, wetted with a solution of 0.1 N sodium hydroxide, were inserted into both ends of the tray. One end of each wick was in contact with the gel medium so that for each compartment there were two wicks contacting the gel. The tray was adjusted in a holder so that it was at an angle of 10° to 20° to the horizontal. The exposed ends, i.e., the ends not in contact with the gel, of the paper wicks at the upper edge of the tray were placed in a solvent reservoir, while the exposed end of the paper wicks from the bottom edge of the tray were permitted to hang freely into an empty container. The solvent was, thus, caused to flow into, through and out of the gel in each compartment.

After a few hours, the 3,5-diod-L-thyronine and sodium levothyroxine spots were observed, under short wave ultraviolet light applied from beneath the tray through the transparent base, to have readily separated.

Example 2

This example demonstrates the manner in which the gel tray assembly of this invention is used in an electrophoretic separation.

In this example, 100 mg. of the non-ionic highly purified derivative of agar, was added to and warmed in 20 ml. of 0.1 N acetate buffer (pH 4.0). The agar derivative used was a product sold commercially under the trade name Agarose. The gel, thus obtained, was poured, while still in a fluid state, into the gel tray described herein. The dividing means was inserted in the tray to form two compartments of equal area. When this was done, the fluid medium was cooled and allowed to set to a gel. Using a micropipette, a mixture of 5 $\mu$l. of a 10 mg./ml. alcoholic solution of phenylpropanolamine hydrochloride and 5 $\mu$l, of a 2 mg./ml. solution of chlorpheniramine maleate was spotted in the gel of one of the compartments. In the other compartment, there was spotted, using a micropipette, 5 $\mu$l. of a 10 mg./ml. alcoholic solution of phenylpropanolamine hydrochloride. Thereafter, Whatman No. 3 MM paper wicks, moistened with 0.1 N acetate buffer (pH 4.0) were inserted into each compartment of the gel tray at one end only in contact with the gel. The exposed end of each paper wick, i.e. the ends not in contact with the gel, were attached to, and served as the connecting link between the tray and the electrode compartments of the electrophoresis apparatus. Current was passed into the gel from the electrophoresis apparatus. The electrophoresis apparatus used is marketed by E-C Apparatus Company.

At a voltage of about 150, separation of the chlorpheniramine maleate spot from the phenylpropanolamine hydrochloride spot occurred in a period of about 2 hours. The spots migrated in the direction of the negative electrode. When the separation was complete, the intact tray was disconnected from the paper wick bridges and it was scanned intact on the Photovolt thin layer chromatography densitometer.

Example 3

This example is included herein to show the manner in which the gel tray assembly of this invention is used in carrying out sequential chromatographic and electrophoretic determinations.

In this example, the material to be separated and detected was first chromatographed as described in Example 1. Thereafter, in order to verify that the material had completely separated and no other compounds were present, the tray was removed intact and, through the paper wick bridges, it was connected to the electrophoresis apparatus.

Thereafter, the tray was disconnected from the paper wick bridges and it was scanned, intact, on the Photovolt thin layer chromatography densitometer.

Having described my invention, what I desire to secure by Letters Patent is:

1. A gel tray assembly comprising the combination of (1) a tray having a base which is transparent to light in the ultraviolet range (2) a detachable dividing means which divides the tray into at least two compartments of equal area (3) a transparent thin layer chromatographic plate, with its coated surface facing down, overlaying said tray and (4) a protective separating means disposed between the bottom coated surface of said plate and the upper surface of the walls of said tray, the upper surface of said separating means being in contact only with the outer edges of said plate.

2. A gel tray assembly for use in chromatographic and electrophoretic techniques for separating organic compounds which comprises the combination of (1) a tray comprising a base which is transparent to light in the ultraviolet range, said base being enclosed by four connected walls (2) detachable dividing means which divides the tray into at least two compartments of equal area, said dividing means being held in place by a retaining means included in one pair of opposite tray walls (3) a transparent thin layer chromatographic plate overlaying the upper surface of the walls of the tray, the coated surface of said plate being face down, and (4) a protective separating means disposed between the upper surface of said tray walls and the lower surface of said plate, the upper surface of said separating means being in contact only with the outer edges of the lower coated surface of said plate.

3. A gel tray assembly for use in chromatographic and electrophoretic techniques for separating organic compounds which comprises the combination of (1) a tray comprising a base enclosed by four connected walls, said base being transparent to light in the ultraviolet range, the first pair of opposite tray walls being continuous and uniform in height throughout their entire length, the second pair of opposite tray walls being lower in height than the first pair of opposite tray walls, each of the walls comprising said second pair of opposite tray walls including at least one means for retaining a detachable dividing means which divides the tray into compartments of equal area, said retaining means being no higher than the said first pair of opposite tray walls and no lower than the second pair of opposite tray walls (2) detachable dividing means set in said tray, the lower surface of said dividing means being in contact throughout its entire length with the upper surface of the tray base, said dividing means being held in place by the retaining means included in the second pair of opposite tray walls, said dividing means being no higher than the first pair of opposite tray walls (3) a transparent thin layer chromatographic plate with its coated surface facing down overlaying said tray, the coated surface of said plate being fluorescent under ultraviolet light, and (4) a protective separating means interposed between the upper surface of the tray walls and said transparent thin layer chromatographic plate, the lower surface of said separating means being in contact with the upper surface of said first pair of opposite tray walls but not in contact with the upper surface of the second pair of opposite tray walls, the upper surface of said separating means contacting only the outer edges of the lower coated surface of said chromatographic plate.

4. A gel tray assembly for use in chromatographic and electrophoretic techniques for separating organic compounds which comprises (1) a rectangular shaped tray comprising a base enclosed by four connected walls, said base being transparent to light in the ultraviolet range, the first pair of opposite tray walls being continuous and uniform in height throughout their entire length, the second pair of opposite tray walls being lower in height than the first pair of opposite tray walls, each of the walls comprising said second pair of opposite tray walls including a means for retaining a dividing means which divides the tray into two compartments of equal area, said retaining means being the same height as the second pair of opposite tray walls (2) detachable dividing means set in said tray, the lower surface of said dividing means being in contact throughout its entire length with the upper surface of the tray base, said dividing means being held in place by the said retaining means included in the said second pair of opposite tray walls and said dividing means being the same height as said retaining means (3) a transparent thin layer chromatographic plate, coated surface facing down, overlaying said tray, the coated surface of said plate being fluorescent under ultraviolet light (4) a separating means interposed between the upper surface of the tray walls and the lower coated surface of said transparent thin layer chromatographic plate, the lower surface of said separating means being in contact with the upper surface of said first pair of opposite tray walls but not in contact with the second pair of opposite tray walls and not in contact with the retaining means included therein, the upper surface of said separating means contacting only the outer edges of the lower coated surface of said chromatographic plate, and (5) a cover means overlaying the upper surface of the said thin layer chromatographic plate.

5. A gel tray assembly for use in chromatographic and electrophoretic techniques for separating organic compounds which comprises (1) a rectangular shaped tray comprising a base enclosed by four connected walls, said base being transparent to light in the ultraviolet range, the first pair of opposite tray walls being continuous and uniform in height throughout their entire length, the second pair of opposite tray walls being lower in height than the first pair of opposite tray walls, each of the walls comprising said second pair of opposite tray walls including a means for retaining a dividing means which divides the tray into two compartments of equal area, said retaining means being of the same height as the first pair of opposite tray walls (2) detachable dividing means set in said tray, the lower surface of said dividing means being in contact throughout its entire length with the upper surface of the tray base, said dividing means being held in place by the said retaining means included in the said second pair of opposite tray walls and said dividing means being the same height as said retaining means (3) a transparent thin layer chromatographic plate, coated surface facing down, overlaying said tray, the coated surface of said plate being fluorescent under ultraviolet light (4) a separating means interposed between the upper surface of the tray walls and the lower coated surface of said transparent thin layer chromatographic plate, the lower surface of said separating means being in contact with the upper surface of said first pair of opposite tray walls and in contact with the upper surface of said retaining means set in said second pair of opposite tray walls, but not in contact with the upper surface of the second pair of opposite tray walls, the upper surface of said separating means contacting only the outer edges of the lower coated surface of said chromatographic plate, and (5) a cover means overlaying the upper surface of said thin layer chromatographic plate.

6. The apparatus of claim 4 wherein (5) is a transparent covering means.

7. The apparatus of claim 5 wherein (5) is a transparent covering means.

References Cited

UNITED STATES PATENTS

| | | | |
|---|---|---|---|
| 3,189,541 | 5/1965 | Brenner et al. | 210—198 X |
| 3,327,857 | 5/1967 | Kopp | 210—198 |
| 3,413,842 | 12/1968 | Hecker | 210—198 X |

JAMES L. DECESARE, Primary Examiner

U.S. Cl. X.R.

210—198